United States Patent [19]

Fairbanks et al.

[11] 4,099,501

[45] Jul. 11, 1978

[54] POLLUTION REDUCING AND FUEL SAVING DEVICE

[76] Inventors: Robert D. Fairbanks; Roger D. Fairbanks, both of P.O. Box 298, Haines, Ak. 99827

[21] Appl. No.: 767,551

[22] Filed: Feb. 10, 1977

[51] Int. Cl.² ............................................. F02M 31/00
[52] U.S. Cl. ................................ 123/122 E; 123/133; 165/164
[58] Field of Search ............ 123/133, 122 E, 122 AB; 165/164, 51

[56] References Cited

U.S. PATENT DOCUMENTS

| 3,472,214 | 10/1969 | Moon | 123/122 E |
| 3,951,124 | 4/1976 | Fairbanks | 123/122 E |

FOREIGN PATENT DOCUMENTS

| 1,278,038 | 10/1960 | France | 164/164 |
| 23,517 of | 1914 | United Kingdom | 164/164 |

*Primary Examiner*—Ronald H. Lazarus
*Attorney, Agent, or Firm*—Burd, Braddock & Bartz

[57] ABSTRACT

An auxiliary fuel heating device for attachment to internal combustion engines for the purpose of reducing the amount of fuel consumed and reducing the objectionable polluting constituents of the exhaust gases therefrom through more efficient combustion of the fuel. The fuel is preheated for presentation to the carburetor or fuel injector in warm liquid form for admixture with air prior to introduction to the combustion chambers. The device comprises a separable housing having separate channel passages for circulation of liquid fuel and radiator liquid in heat exchanging relationship. The device is intended for use under low ambient temperature conditions such as encountered during winter months in the northern states of the United States and similar cold areas.

10 Claims, 8 Drawing Figures

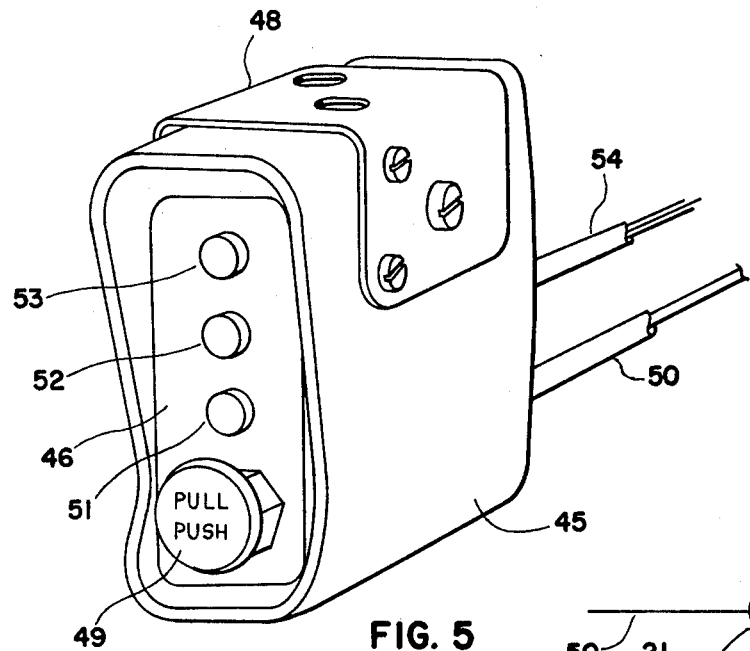
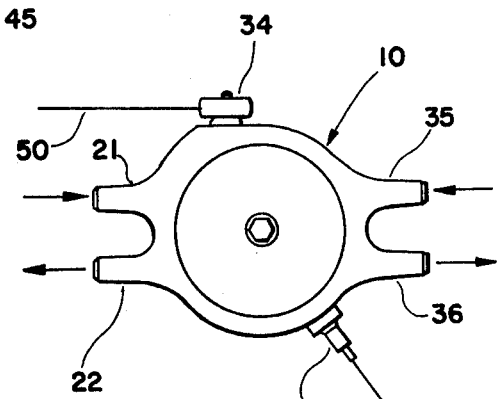
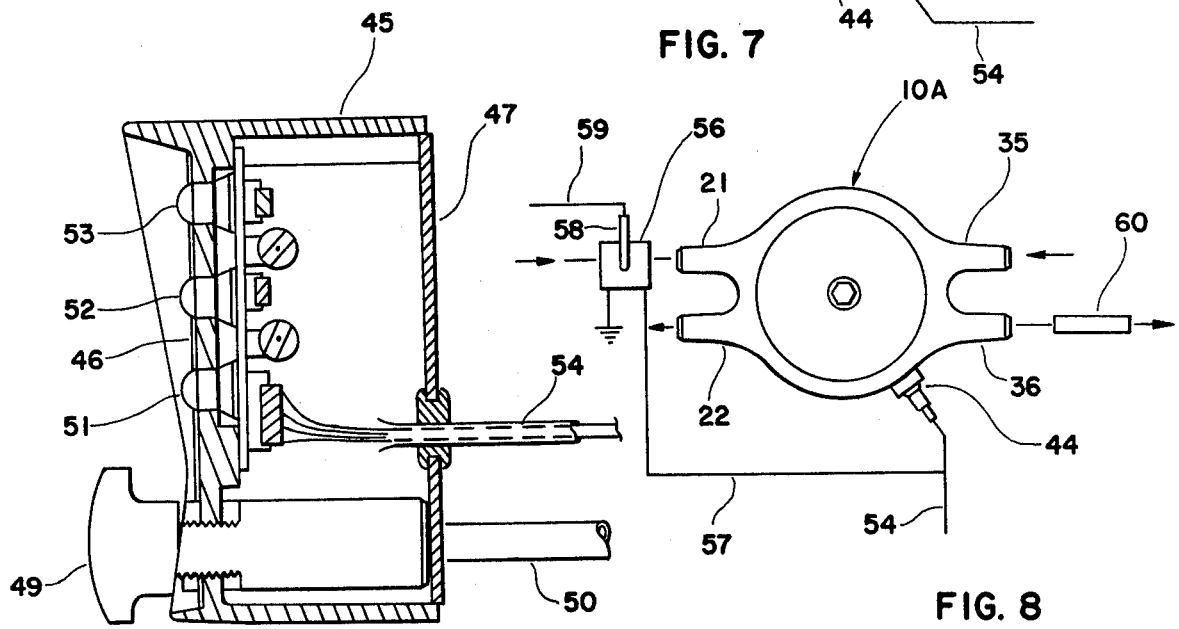

POLLUTION REDUCING AND FUEL SAVING DEVICE

BACKGROUND OF THE INVENTION

1. Field of the Invention

This invention relates to an auxiliary pollution reducing and fuel saving device for use in connection with internal combustion engines to reduce the contaminants in the exhaust gas and the amount of fuel consumed through more efficient fuel consumption. Besides reducing pollution, the use of the device improves the dependability, efficiency and performance of internal combustion engines and renders the engines more economical to operate by minimizing fuel consumption. While enhancing the quality of the environment by reducing objectionable contaminants ordinarily spewed into the atmosphere from engine exhausts, use of the device of the present invention alleviates some of the adverse effects of higher prices and short supplies of available fuels resulting from the current energy crisis. These objectives are achieved by heating the fuel in heat exchanging relationship with radiator fluid to preheat the fuel for presentation to the carburetor or fuel injector in warm atomized liquid form for admixture with air prior to introduction to the combustion chambers of the engine.

The exhaust gases from the average automobile and similar vehicles powered by internal combustion engines contain a mixture of carbon monoxide, carbon dioxide, unburned or partially burned hydrocarbons, nitrogen, some of the nitrogen oxides, etc. These exhaust gases contribute to the production of smog and similar forms of air pollution in such quantities as to be considered objectionable and potentially harmful. The federal government and states, led by California, have legislated increasingly stringent requirements for control of emissions from automotive engines.

Efforts to meet present and anticipated requirements have led to the addition of complicated and expensive catalytic converters and mufflers and after-burners, and the like, designed to treat the exhaust gases and resulting in increased fuel consumption, decreased engine efficiency and decreased mileage. Resistance to compliance with pollution control requirements has increased as shortages of available fuel have curtailed ready availability of fuel and caused sharp price increases.

Heretofore, efforts toward abatement of vehicle exhaust pollution has been directed to treatment of the exhaust gases which already contain the objectionable contaminants. The present invention is directed toward abatement of pollution at the source by promoting more efficient combustion of the fuel so as to minimize production of contaminants in the combustion chamber. This is done by preheating the fuel prior to combustion by means of a simple efficient heat exchanger unit as described in detail herein. It has been found that the result is less exhaust pollution with possible 30 to 40 per cent improvement when the unit is used in a car with a conventional exhaust system, as compared to the same vehicle without the unit. There is significant reduction of disagreeable odor indicating reduction of hydrocarbon contaminants. The carbon dioxide content of the exhaust is higher indicating the presence of less carbon monoxide and better combustion of carbon monoxide. At the same time, through more efficient engine operation, better mileage is achieved resulting in more economical use of fuel.

The improved dependability, efficiency and performance of a vehicle engine with which the pollution control is used is especially significant in minimizing fuel consumption and resulting in economical operation when the engine is operated under cold weather conditions. It is well known that internal combustion engines such as are commonly used in automobiles, trucks, buses and various other types of automotive vehicles, are relatively less efficient when operated in low temperatures such as are common in northern climes during the winter months. Most of the northern regions of the United States are subjected to subzero temperatures each winter for periods ranging from a few days to several weeks. Portions of Alaska and Northern Canada are subjected to extreme subzero temperatures down as low as −70° F. The loss of dependability, efficiency and performance of internal combustion engines during cold winter months is due largely to the inability of the usual carbureting systems to adequately and thoroughly atomize the cold raw liquid hydrocarbon fuel as it is delivered into the combustion chambers of the engine.

2. The Prior Art

Numerous attempts have heretofore been made to provide means for preheating the liquid fuel before delivery to the engine cylinders. U.S. Pat. No. 3,951,124, issued Apr. 20, 1976 to one of the present applicants, contains an extensive review of the prior art as illustrated in earlier U.S. patents. With the exception of the aforesaid U.S. Pat. No. 3,951,124, none of the prior art patents suggests any relationship between preheating of fuel and pollution control. The aforesaid patent describes a simplified fuel system for internal combustion engines embodying a pollution control unit in the form of a device for preheating the liquid hydrocarbon fuel prior to delivery to the usual engine carburetor where the liquid fuel may be thoroughly and completely atomized to provide a highly combustible fuel mixture which may be readily ignited for more complete and efficient combustion in the combustion chambers of the engines, without regard to ambient conditions, especially subfreezing and subzero atmospheric temperatures.

SUMMARY OF THE INVENTION

The present invention is a specific improvement over that of the aforesaid U.S. Pat. No. 3,951,124. It is directed to distinctly different and improved structure for performing the same function. The device of the present invention is characterized by a separable multiple part housing having a central body portion with a base portion on one side and a cap portion on the other, each having abutting face-to-face parallel planar surfaces, the housing being held together by appropriate fastening means and provided with sealing means between the abutting face-to-face planar surfaces of adjacent body portions. The central housing portion of the body is provided on one side with an inlet fitting and an outlet fitting for radiator liquid communicating with the opposite ends of a curvilinear flow channel formed in the interface between the central body portion and one of the other body portions of the housing. According to one form of the invention, a valve is provided within the housing for regulating flow of radiator liquid and external means are provided for operating that valve. Alternatively, an external valve may be used. A further inlet fitting and outlet fitting are provided on the opposite side of the central body portion of the housing, to conduct fuel through another curvilinear channel formed in the interface between the central body portion and the other of said other body portions of the housing. The curvilinear passages are adjacent but spaced apart so that the liquids pass through the passages in heat exchanging relation, preferably in counter-current flow.

BRIEF DESCRIPTION OF THE DRAWINGS

The invention is illustrated in the accompanying drawings in which corresponding parts are identified by the same numerals and in which:

FIG. 5 is a perspective view of a temperature monitoring and control assembly;

FIG. 6 is a vertical section through the assembly of FIG. 5;

FIG. 7 is a schematic diagram showing the manner in which the preheater device is connected to an internal combustion engine; and FIG. 8 is a similar schematic diagram showing an alternative arrangement.

DETAILED DESCRIPTION OF THE PREFERRED EMBODIMENT

Figure 1:
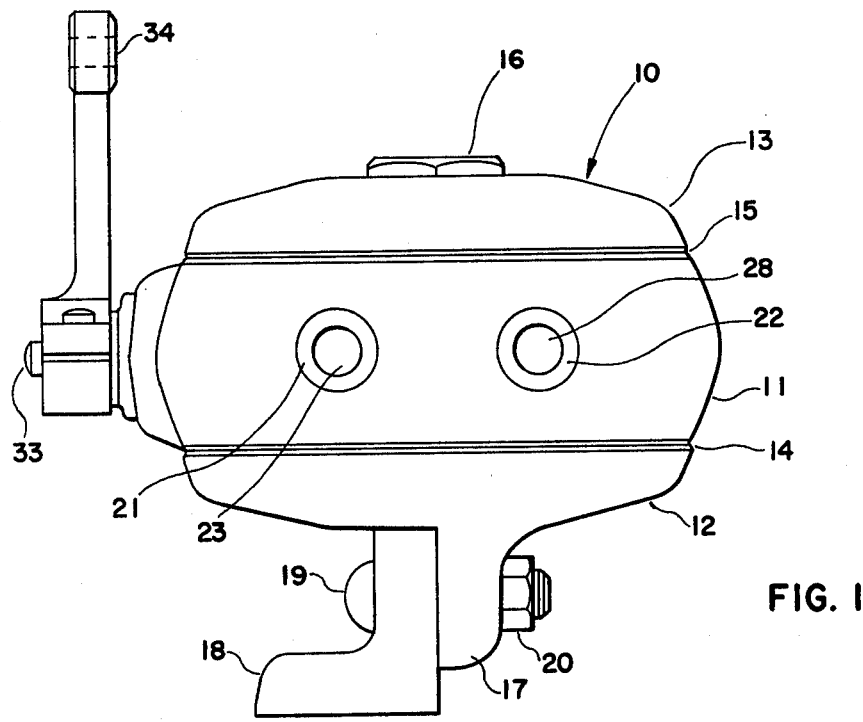
FIG. 1 is an end elevation of the preheater device.

Referring now to the drawings, and particularly to FIGS. 1 through 4, there is shown a separable housing indicated generally at 10 and comprised of a central body portion 11, a base portion 12 and a cap portion 13. The housing is generally bulbous in appearance. A smooth flat interface 14 exists where the central body and base portions of the housing abut in face-to-face planar relation and a similar smooth flat interface 15 exists where the cap and central body portions meet. The housing portions are held together by means of a screw 16 extending through the cap and central body portions and threadably engaging the base portion, or equivalent fastening means. The housing base portion 12 is provided with a downwardly extending projection 17 by means of which the device may be secured to a mounting bracket 18, by means of bolt 19 and nut 20 or equivalent fastening means, for attachment to or adjacent to the internal combustion engine in connection with which the device is to be used.

Figure 3:
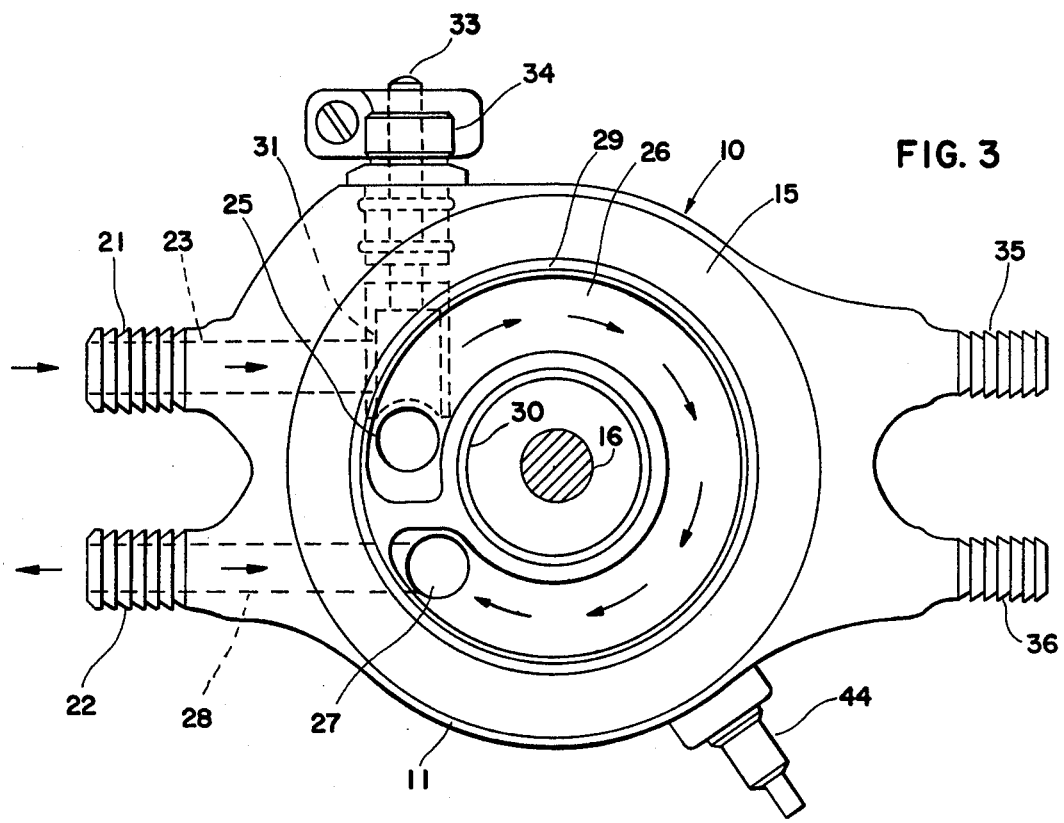
FIG. 3 is a horizontal section on the line 3—3 of FIG. 2 and in the direction of the arrows.

The central body portion includes an inlet fitting 21 for receiving radiator liquid circulating from the usual water circulating jacket of a vehicle engine and an outlet fitting 22 for returning radiator liquid to the engine radiator, usually to the water circulating conduit of the radiator which connects the lower end of the radiator to a water circulating pump. Inlet fitting 21 includes a passage 23 which communicates with a further cylindrical passage 24 which in turn communicates through port 25 with a generally circular but discontinuous flow channel 26 formed in the interface 15 between the central body portion and cap portions of the housing. As best seen in FIG. 3, radiator liquid flows in a circular pattern about 330° from inlet port 25 to an outlet port 27 which communicates with passage 28 through discharge fitting 22. A pair of concentric 0-rings 29 and 30 are disposed on opposite sides of water flow channel 26 to insure a liquid-tight seal between the body portions at the interface.

Figure 2:
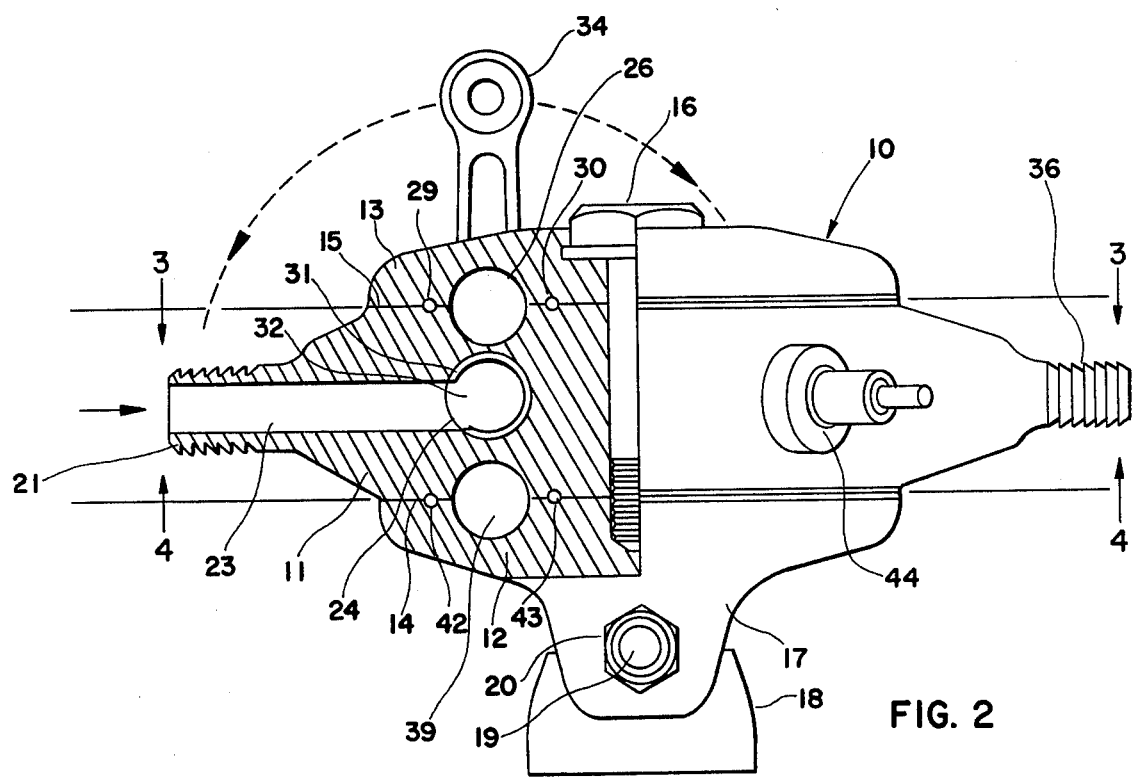
FIG. 2 is a side elevation, shown partly in vertical section.

According to one form of the invention, a rotary hollow cylindrical spigot type valve 31 is disposed in channel 24 to control water flow between passage 23 and channel 26. Valve member 31 is closed at one end, open at the other, and has an aperture 32 of a size and so positioned as to communicate with passage 23. The valve means has a stem 33 to which a lever arm 34 is attached to rotate the valve member to control water flow, and thereby control heating of the fuel. As shown in FIG. 2, the valve is open so that water flowing through passage 23 enters opening 32 in the valve member, flows out through the open end of the spigot valve and through port 25 into flow channel 26.

Figure 4:
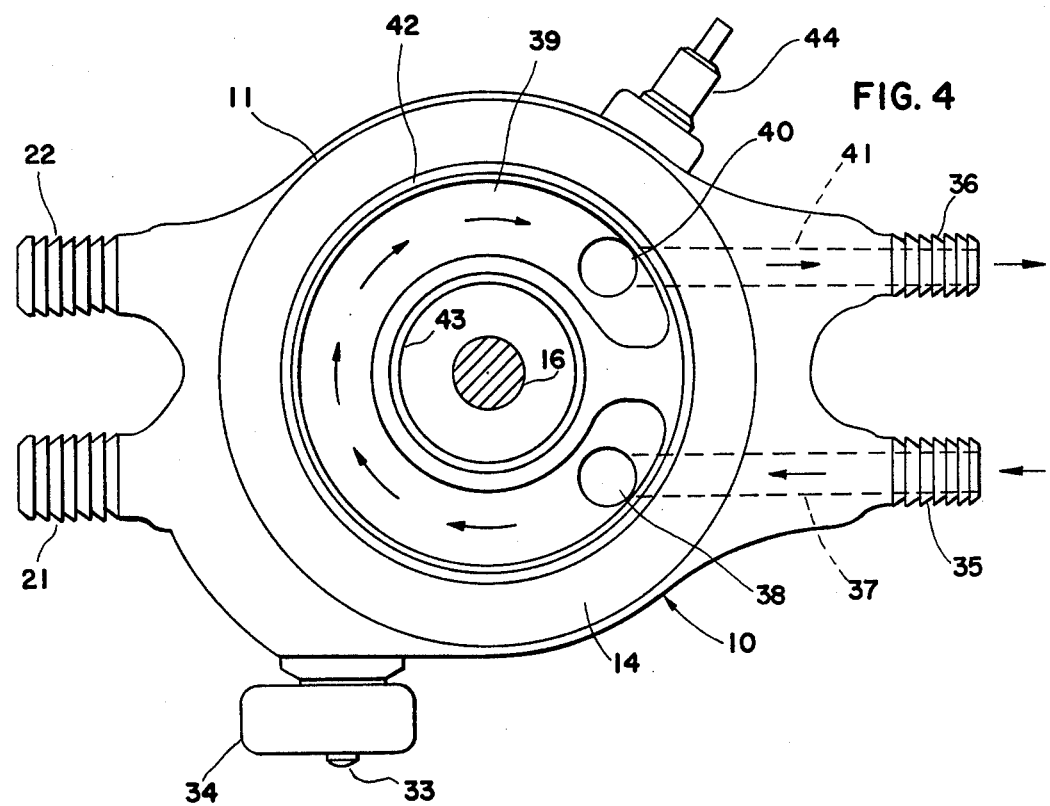
FIG. 4 is a further horizontal section on the line 4—4 of FIG. 2.

The opposite side of the central housing portion includes a fuel inlet fitting 35 and fuel outlet fitting 36 by which the heating device is connected into the fuel supply line between the fuel pump of the vehicle and the carburetor or fuel injector of the vehicle. As best seen in FIG. 4, fitting 35 has a passage 37 which communicates with a port 38 to a fuel flow channel 39 formed in the interface 14 between the central body and base portions of the housing. Flow channel 39 is a generally circular but discontinuous passage. The fuel circulates through about 300° and exits the flow channel through a discharge port 40 which communicates with passage 41 through fitting 36. Concentric O-rings 42 and 43 on opposite sides of flow channel 39 insure a tight seal in the assembled housing.

It will be noted that the inlet fittings 21 and 35 and outlet fittings 22 and 36 are in substantially longitudinal alignment so that the radiator liquid and fuel pass through the housing in counter-current heat exchange relation. The body members are formed, as by casting, from a metal having good heat conducting properties, such as aluminum or alloys composed predominantly of aluminum. A preferred material is the aluminum-zinc casting alloy sold under the designation "AG 3-40A". Optionally a temperature sensor 44 is threadably or otherwise suitably inserted into a radial passage in the central body portion adjacent to but separated from the water and fuel flow channels.

Referring now to FIGS. 5 and 6, there is shown one form of a temperature monitoring and control assembly including a housing 45 having a front face 46 and a back plate 47. The housing is provided with a universal bracket 48 adapting it to installation under the dash of a wide variety of cars, trucks and other vehicles. The control assembly includes a knob 49 controlling a push-pull cable connected to lever arm 34 for controlling operation of the radiator liquid flow within the preheater unit. Alternatively a lever controlling a slide connector may be used to manually operate the valve. The control assembly also includes visual temperature monitoring means in the form of signal lights 51–53 connected through electrical conductor means 54 to the temperature sensor 44. As an example, signal light 51 may be yellow and programmed to be lighted when the temperature within the preheater housing is below 80° F, the pre-operating condition. Light 52 may be green and programmed to be lighted when the temperature within the preheater housing is between about 80° to 170° F, the normal operating range. Light 53 may be red and programmed to be lighted when the preheater temperature is above about 170° F indicating overheating of the fuel and the need for restriction of flow of radiator liquid through the preheater until the temperature falls below about 170° F.

FIG. 7 illustrates schematically the several connections of the preheater device for flow of hot water from the vehicle radiator and back to the radiator, flow of fuel from the fuel pump and to the carburetor or fuel injector and the control connections to the temperature monitoring and control assembly.

FIG. 8 shows an alternative arrangement in which the water flow control valve 56 is located externally of housing 10A in the hot water flow line between the radiator and inlet 35. Valve 56 may be operated automatically in response to temperature changes as by electrical connection 57 between sensor 44 and the valve, or manually through a mechanical arm 56 or similar means connected through a cable or equivalent means to the control panel. When needed, a pressure relief valve or regulator 60 may be installed in the warm gas flow line between the housing and carburetor or fuel injector.

The preheater varies in size dependent upon the size of the engine of the vehicle with which it is to be used. For larger vehicles such as trucks or buses, the heater is proportionately larger than for automobiles.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A pollution reducing and fuel saving device adapted for use in conjunction with liquid-cooled internal combustion engines including a carburetor or fuel injector and a fuel supply tube for conducting fuel to the carburetor or fuel injector, a radiator, and flow lines extending from the radiator to the liquid circulating jacket of the engine, said device comprising:
    (A) a housing of heat conductive metal, said housing including:
        (1) a central body portion,
        (2) a base portion, and
        (3) a cap portion, each having abutting face-to-face planar surfaces,
        (4) fastening means for securing said body portions together, and
        (5) sealing means between the abutting face-to-face planar surfaces of adjacent body portions,
    (B) a radiator liquid inlet fitting and a radiator liquid outlet fitting on one side of said central body portion to connect into the radiator liquid flow of a radiator,
    (C) a first curvilinear radiator liquid flow channel formed in the interface between said central body portion and one of said other body portions,
    (D) a pair of further radiator liquid flow channels in said central body portion connecting said radiator liquid fittings with the ends of said first curvilinear flow channel.
    (E) a fuel inlet fitting and a fuel outlet fitting on the opposite side of said central body portion to connect to a fuel supply line between a fuel pump and carburetor or fuel injector,
    (F) a second separate curvilinear fuel flow channel formed in the interface between said central body portion and the other of said other body portions adjacent to but spaced from said first curvilinear flow channel,
    (G) a pair of further fuel flow channels in said central body portion connecting said fuel fittings with the ends of said second curvilinear flow channel, and
    (H) means for mounting said housing.

2. A device according to claim 1 further characterized in that said housing portions are formed of a material selected from the class consisting of aluminum and alloys thereof composed predominantly of aluminum.

3. A device according to claim 1 further characterized in that said curvilinear channels are substantially circular in configuration and said sealing means comprises a pair of concentric resilient O-rings disposed between the interfaces of said housing portions spaced on opposite sides of said channels.

4. A device according to claim 1 further characterized in that said radiator liquid inlet and said fuel inlet are in substantial longitudinal alignment and said radiator liquid outlet and said fuel outlet are in substantial longitudinal alignment whereby the radiator liquid and fuel pass through their respective curvilinear channels in counter-current heat exchanging flow.

5. A device according to claim 1 further characterized in that:
    (A) valve means are disposed in one of said further radiator liquid flow channels, and
    (B) means external of said housing are provided to operate said valve means.

6. A device according to claim 5 further characterized in that said valve means is a rotary hollow cylindrical spigot type valve and said means for operating said valve comprises a lever arm adapted to be connected to a control knob.

7. A device according to claim 1 further characterized in that:
    (A) said radiator liquid inlet fitting is connected to a radiator through a liquid flow line, and
    (B) valve means are disposed in said flow line.

8. A device according to claim 7 further characterized in that said valve means is manually operated.

9. A device according to claim 7 further characterized in that said valve means is automatically operated in response to temperature sensing means in said housing.

10. A device according to claim 1 further characterized in that a temperature sensor is disposed in said central body portion adjacent to said curvilinear flow channels, said sensor being adapted to be connected to visual temperature indicator means.

* * * * *